(12) United States Patent
Ryonai et al.

(10) Patent No.: US 8,946,579 B2
(45) Date of Patent: Feb. 3, 2015

(54) TOUCH PANEL

(71) Applicant: Panasonic Corporation, Osaka (JP)

(72) Inventors: Hiroshi Ryonai, Osaka (JP); Seiichi Minami, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 115 days.

(21) Appl. No.: 13/771,152

(22) Filed: Feb. 20, 2013

(65) Prior Publication Data

US 2013/0264179 A1  Oct. 10, 2013

(30) Foreign Application Priority Data

Apr. 9, 2012  (JP) ................................. 2012-088261

(51) Int. Cl.
  *H03K 17/975* (2006.01)
  *G06F 3/041* (2006.01)
(52) U.S. Cl.
  CPC . *H01F 1/64* (2013.01); *G06F 3/041* (2013.01)
  USPC ............................ 200/600; 345/173; 345/174
(58) Field of Classification Search
  USPC ........................... 200/269, 600; 345/173, 174
  See application file for complete search history.

(56) References Cited

U.S. PATENT DOCUMENTS

| 8,355,011 | B2 * | 1/2013 | Kim et al. ..................... 345/174 |
| 2004/0257344 | A1 * | 12/2004 | Matsumoto et al. .......... 345/173 |
| 2009/0201268 | A1 * | 8/2009 | Endo et al. .................... 345/174 |
| 2010/0053854 | A1 * | 3/2010 | Nishikawa et al. ....... 361/679.01 |
| 2010/0231543 | A1 * | 9/2010 | Momose ........................ 345/173 |
| 2011/0063250 | A1 * | 3/2011 | Lee et al. ...................... 345/174 |
| 2011/0216020 | A1 * | 9/2011 | Lee et al. ...................... 345/173 |
| 2011/0227861 | A1 * | 9/2011 | Kim et al. ..................... 345/174 |
| 2011/0308929 | A1 * | 12/2011 | Kim et al. ..................... 200/600 |
| 2011/0310053 | A1 * | 12/2011 | Kim et al. ..................... 345/174 |
| 2012/0006585 | A1 * | 1/2012 | Chikahisa ..................... 174/257 |
| 2012/0162099 | A1 * | 6/2012 | Yoo et al. ...................... 345/173 |

FOREIGN PATENT DOCUMENTS

JP   2008-70938   3/2008

* cited by examiner

*Primary Examiner* — Kyung Lee
(74) *Attorney, Agent, or Firm* — Panasonic Patent Center

(57) ABSTRACT

A touch panel includes an upper substrate having insulating property, an upper conductive layer on a lower surface of the upper substrate, an intermediate layer on a lower surface of the upper conductive layer, an upper electrode on a lower surface of the intermediate layer, a lower conductive layer facing the upper conductive layer with a predetermined gap interposed between the conductive layers, a lower electrode on an upper surface of the lower conductive layer, and a lower substrate on a lower surface of the lower conductive layer and having insulating property. The upper and lower electrodes contain 70 wt. % to 98 wt. % of conductive metal. The intermediate layer contains a resin and 40 wt. % to 90 wt. % of carbon and has a thickness ranging from 1 µm to 50 µm. The touch panel has resistance to environment and is applicable to a large size.

19 Claims, 3 Drawing Sheets

TOUCH PANEL

TECHNICAL FIELD

The present invention relates to a touch panel mainly used for operation of various electronic devices.

BACKGROUND

In an increasing number of various electronic devices such as portable phone and electronic cameras or car navigation systems, light-transmitting touch panels are mounted on upper surfaces of liquid crystal displays, and various functions of the electronic devices are switched with the touch panels. The number of types of electronic devices having touch panels mounted thereon has further increased, and the touch panels have been required to have resistance to environment.

FIG. 4 is a sectional view of conventional touch panel 30 described in Japanese Patent Laid-Open Publication No. 2008-070938. Touch panel 30 includes upper wiring plate 1, lower wiring plate 2, and adhesive layer 3. Upper wiring plate 1 includes upper substrate 11, upper conductive layer 12, upper electrode 13, and insulating layer 14. Lower wiring plate 2 includes lower substrate 21, lower conductive layer 22, lower electrode 23, insulating layer 24, and dot spacers 25. Light-transmitting upper conductive layer 12 having conductive property and a rectangular shape is formed on the lower surface of light-transmitting upper substrate 11. Light-transmitting lower conductive layers 22 having conducting property and a rectangular shape is formed on the upper surface of light-transmitting lower substrate 21. One pair of upper electrodes 13 are arranged at the left and right ends of upper conductive layer 12. One pair of lower electrodes 23 are arranged at forward and backward ends of lower conductive layer 22. End parts of upper electrode 13 and lower electrode 23 extend to respective front ends of peripheries of upper substrate 11 and lower substrate 21. A section of lower electrode 23 extending from a front end side of lower substrate 21 to a rear end side thereof appears below upper electrode 13 on the right. Insulating layer 14 and insulating layer 24 are made of acrylic resin. Insulating layer 14 covers upper electrode 13, while insulating layer 24 covers lower electrode 23. Dot spacers 25 are disposed on the upper surface of lower conductive layer 22. An adhesive agent constituting adhesive layer 3 is applied onto the peripheries of upper substrate 11 and lower substrate 21 to bond substrates 11 to substrate 12 while conductive layer 12 faces lower conductive layer 22 with a predetermined gap.

Materials of upper electrode 13 and lower electrode 23 will be detailed below.

Upper electrode 13 and lower electrode 23 are made of resin having silver powder and carbon powder dispersed therein. The resin is made of polyester containing epoxy resin. The content of silver powder ranges from 10 wt. % to 30 wt. %, while the content of carbon powder ranges 1 wt. % to 5 wt. %. In this case, the carbon powder has a particle diameter ranging from 30 nm to 40 nm and a Brunauer Emmett Teller (BET) specific surface area not smaller than 700 m$^2$/g.

Upper electrode 13 and lower electrode 23 are made of the above materials to connect fine carbon powder particles into chain structures and to disperse the carbon powder particles between silver powder particles. For this reason, upper electrode 13 can be electrically connected with upper conductive layer 12 stably, and lower electrode 23 can be electrically connected with lower conductive layer 22 stably. Even if an operating environment of touch panel 30 changes, for example even if touch panel 30 is used in, for example, a high-temperature, high-humidity atmosphere, these materials stably maintain the electric connections between upper electrode 13 and upper conductive layer 12 and between lower electrode 23 and lower conductive layer 22.

Since the materials of upper electrode 13 and lower electrode 23 of conventional touch panel 30 are formed by dispersing silver powder and carbon powder in resin, resistances of upper electrode 13 and lower electrode 23 are larger to cause voltage to drop more than upper electrode 13 and lower electrode 23 made mainly of silver.

Touch panel 30 is arranged above a liquid-crystal display to be installed into an electronic device. Upper electrode 13 and lower electrode 23 are electrically connected to a control circuit, such as a microcomputer, of the electronic device.

Upon an operator having a finger or a pen depress the upper surface of upper substrate 11 according to a display of the liquid-crystal display behind touch panel 30, upper substrate 11 causes upper conductive layer 12 to contact lower conductive layer 22 at the depressed position. While applying a voltage from sequentially to upper electrode 13 and lower electrode 23, the control circuit detects the depressed position based on a voltage ratio of these electrodes to switch various functions of the device.

SUMMARY

A touch panel includes an upper substrate having insulating property, an upper conductive layer on a lower surface of the upper substrate, an intermediate layer on a lower surface of the upper conductive layer, an upper electrode on a lower surface of the intermediate layer, a lower conductive layer facing the upper conductive layer with a predetermined gap provided between the conductive layers, a lower electrode on an upper surface of the lower conductive layer, and a lower substrate on a lower surface of the lower conductive layer and having insulating property. The upper and lower electrodes contain 70 wt. % to 98 wt. % of conductive metal. The intermediate layer contains a resin and 40 wt. % to 90 wt. % of carbon and has a thickness ranging from 1 μm to 50 μm.

The touch panel has resistance to environment and is applicable to a large size.

DETAILED DESCRIPTION OF PREFERRED EMBODIMENT

Figure 1:
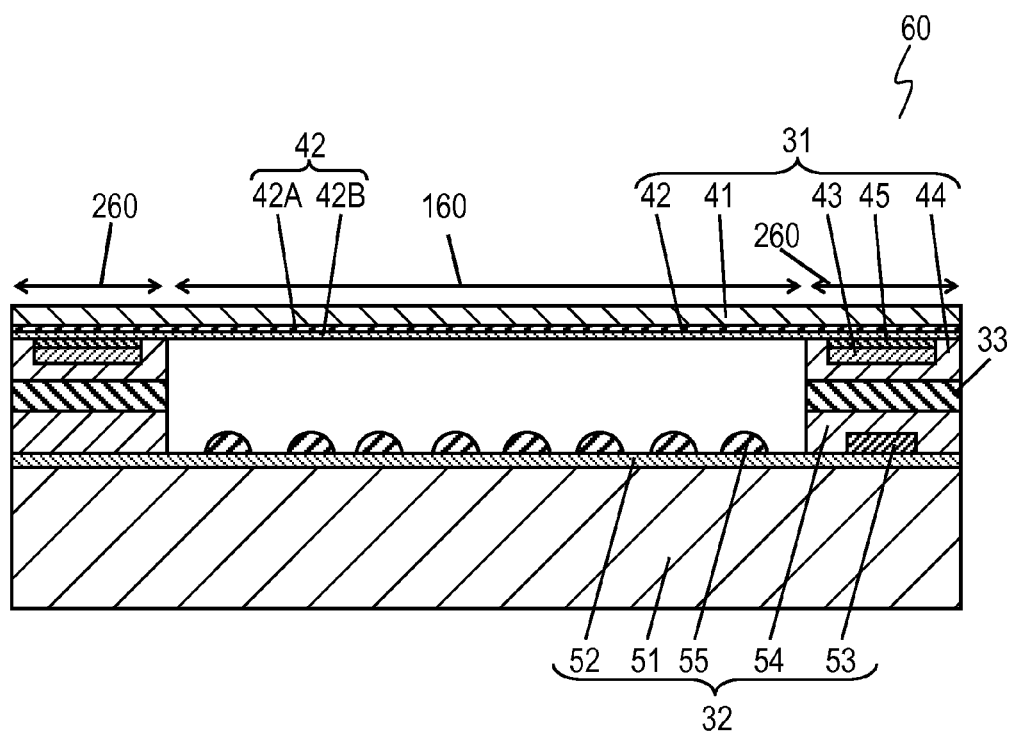
FIG. 1 is a sectional view of a touch panel according to an exemplary embodiment.
Figure 2:
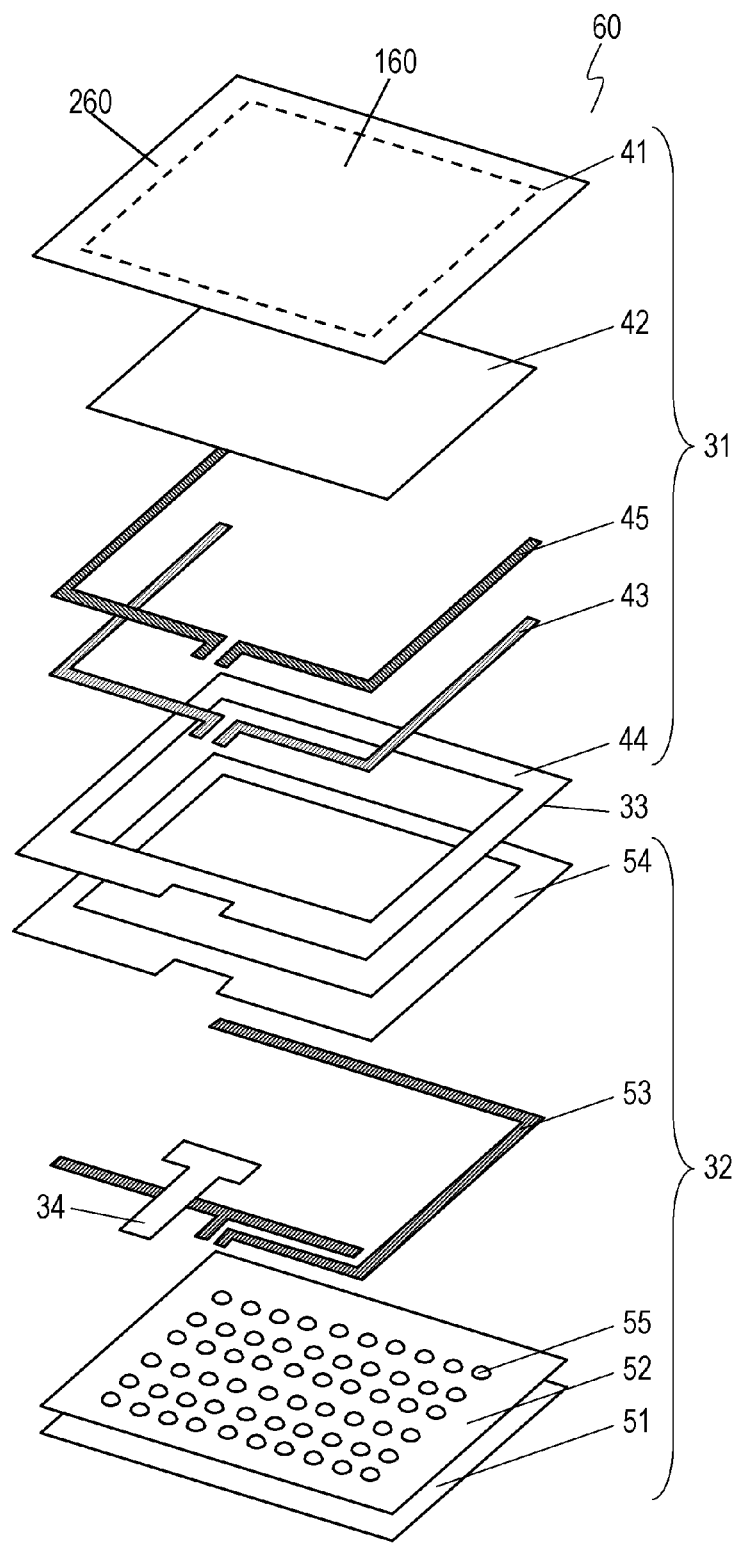
FIG. 2 is an exploded perspective view of the touch panel according to the embodiment.

FIGS. 1 and 2 are a sectional view and an exploded perspective view of touch panel 60 according to an exemplary embodiment, respectively. Touch panel 60 includes upper wiring plate 31, lower wiring plate 32, adhesive layer 33, and wiring board 34. Upper wiring plate 31 includes upper substrate 41, upper conductive layer 42, upper electrode 43, insulating layer 44, and intermediate layer 45. Intermediate layer 45 is provided between upper conductive layer 42 and upper electrode 43. Lower wiring plate 32 includes lower substrate 51, lower conductive layer 52, lower electrode 53, insulating layer 54, and dot spacers 55. Upper substrate 41 of touch panel 60 has operation region 160 to be operated by an operator and non-operation region 260 no to be operated by the operator. According to the embodiment, an entire circumference of operation region 160 is surrounded by non-operation region 260. Upper conductive layer 42 and lower conductive layer 52 extend to operation region 160 and non-operation region 260. Dot spacers 55 are arranged in operation region 160. Upper electrode 43, insulating layer 44, intermediate layer 45, lower conductive layer 52, lower electrode 53, and insulating layer 54 are formed in non-operation region 260 and are not formed in operation region 160.

A configuration of upper wiring plate 31 will be detailed below.

Upper substrate 41 is made of a resin film, such as a polyethylene terephthalate resin film having high light transmittance and insulating property, and has substantially a rectangular shape. A highly light-transmitting conductive layer 42A made of, e.g. indium tin oxide is formed on the lower surface of upper substrate 41 by, e.g. a sputtering method, and a conductive polymer film 42B is formed on a surface of the conductive film by, e.g. an applying method to form upper conductive layer 42.

According to the embodiment, while the upper conductive layer 42 is provided on the lower surface of upper substrate 41, a total light transmittance serving as an index of light transmittance is not smaller than 80%, and an absorptance serving as an index of environment resistance is 0.6% (obtained by a measurement method determined by JISK7209) after immersion for 24 hours.

Two intermediate layers 45 extend from a front end of the lower surface of upper conductive layer 42 to left and right ends, and extend backward at the left and right ends to be arranged in parallel with each other. Intermediate layer 45 contains a resin, such as a phenolic resin, and carbon. The carbon contains carbon black and graphite. The carbon may contain only carbon black and graphite. The carbon black is amorphous carbon fine particles. The graphite is a mineral containing carbon having hexagonal crystals.

According to the embodiment, the content of the carbon is, for example, 58 wt. %. The carbon content ranges preferably from 40 wt. % to 90 wt. %. The thickness of intermediate layer 45 ranges preferably from 1 μm to 50 μm. This thickness can improve electric stabilities of upper conductive layer 42 and upper electrode 43. A line width of intermediate layer 45 is preferably equal to or slightly larger than a line width of upper electrode 43.

Upper electrodes 43 are provided on the lower surfaces of intermediate layers 45, and are arranged in parallel to each other such that upper conductive layer 42 is provided between upper electrodes 43. Upper electrode 43 contains a resin, such as a polyester resin and a conductive metal. According to the embodiment, the conductive metal is silver. According to the embodiment, the content of silver is, for example, 89 wt. %. The silver content ranges preferably from 70 wt. % to 98 wt. %.

Insulating layer 44 covers the surface of upper electrode 43. Insulating layer 44 is made of an insulating material, such as an acrylic resin, having insulating property. According to the embodiment, the thickness of insulating layer 44 is 20 μm, and ranges preferably from 5 μm to 50 μm. The width of insulating layer 44 is, for example, 5 mm such that insulating layer 44 covers upper electrode 43 and intermediate layer 45. The shape of insulating layer 44 may be a frame shape as shown in FIG. 2, and may be a rail shape like upper electrode 43.

Intermediate layer 45 is provided between upper electrode 43 and upper conductive layer 42. The content of silver serving as a conductive metal in upper electrode 43 and lower electrode 53 ranges from 70 wt. % to 98 wt. %. Intermediate layer 45 contains a resin and 40 wt. % to 90 wt. % of carbon, and has a thickness ranging from 1 μm to 50 μm. This configuration reduces a resistance of upper electrode 43 and electrically connects upper electrode 43 with upper conductive layer 42 stably.

Insulating layer 44 and upper conductive layer 42 cover upper electrode 43 and intermediate layer 45 to sandwich upper electrode 43 and intermediate layer 45, and hence, prevent moisture from infiltrating in upper electrode 43 and intermediate layer 45, thereby electrically connecting upper electrode 43 with upper conductive layer 42 stably.

A configuration of lower wiring plate 32 will be described below.

Lower substrate 51 is made of glass unlike upper substrate 41. Since lower substrate 51 is made of glass, lower substrate 51 has very small water-absorbing property, and an absorptance is very low, i.e., less than 0.1% after immersion for 24 hours. Like upper conductive layer 42, a highly light-transmitting conductive film made of, e.g. indium tin oxide is formed on the upper surface of lower substrate 51 by a sputtering method to form lower conductive layer 52.

According to the embodiment, lower conductive layer 52 provided on the upper surface of lower substrate 51 has a total light transmittance serving as an index of light transmittance is not smaller than 80%.

Lower electrodes 53 are provided on the upper surface of lower conductive layer 52. Lower electrodes 53 are arranged to parallel sandwich lower conductive layer 52 on a front end side and a rear end side of lower conductive layer 52. End parts of lower electrode 53 extend on front end side and rear end side of lower conductive layer 52 and are arranged almost at the center of the front end side of lower conductive layer 52. Lower electrode 53 is made of the same material as that of upper electrode 43.

Lower substrate 51 made of glass having very small water-absorbing properties allows moisture to be rarely infiltrated through lower substrate 51, and prevents the moisture from reaching lower conductive layer 52. This maintains an electric contact between lower conductive layer 52 and lower electrode 53 without an intermediate layer corresponding to intermediate layer 45 of upper substrate 41.

Insulating layer 54 covers a surface of lower electrode 53. Insulating layer 54 has a thickness and a line width equal to those of insulating layer 44 and is made of the same material as that of insulating layer 44.

Dot spacers 55 have semispherical shapes made of an insulating resin, such as an epoxy resin or a silicone resin, and are arranged on the upper surface of lower conductive layer 52 at predetermined intervals.

Wiring board 34 is a flexible printed board having plural wires thereon, and is arranged between upper wiring plate 31 and lower wiring plate 32. One ends of the wires of wiring board 34 are electrically connected to upper electrode 43 and lower electrode 53 with, e.g. an anisotropic conductive film or the like.

Insulating layer 44 and insulating layer 54 are not formed at parts where upper electrode 43 and lower electrode 53 are connected to wiring board 34. Upper conductive layer 42 and lower conductive layer 52 are removed by etching at parts where upper conductive layer 42 and lower conductive layer 52 are close to wiring board 34 to prevent a short-circuit to wiring board 34.

Adhesive layer 33 is made of, e.g. an acrylic adhesive agent. Outer circumferences of upper substrate 41 and lower substrate 51 are bonded to each other with adhesive layer 33, such that upper conductive layer 42 faces lower conductive layer 52 with a predetermined gap to configure touch panel 60.

Touch panel 60 is arranged in front of a liquid-crystal display to be installed into an electronic device. Upper electrode 43 and lower electrode 53 are electrically connected to a control circuit, such as a microcomputer, of the electronic device through wiring board 34.

An operation of touch panel 60 will be described below.

An operator has a finger or a pen depress the upper surface of upper substrate 41 according to a display of the liquid-crystal display visually recognized through touch panel 60. The depressing bends upper substrate 41 to cause upper conductive layer 42 to contact lower conductive layer 52 at the depressed position. While applying a voltage sequentially to upper electrode 43 and lower electrode 53, the control circuit detects the depressed position based on a voltage ratio of these electrodes.

The control circuit selects a function displayed on the liquid-crystal display at the detected position to execute the function.

Figure 4:
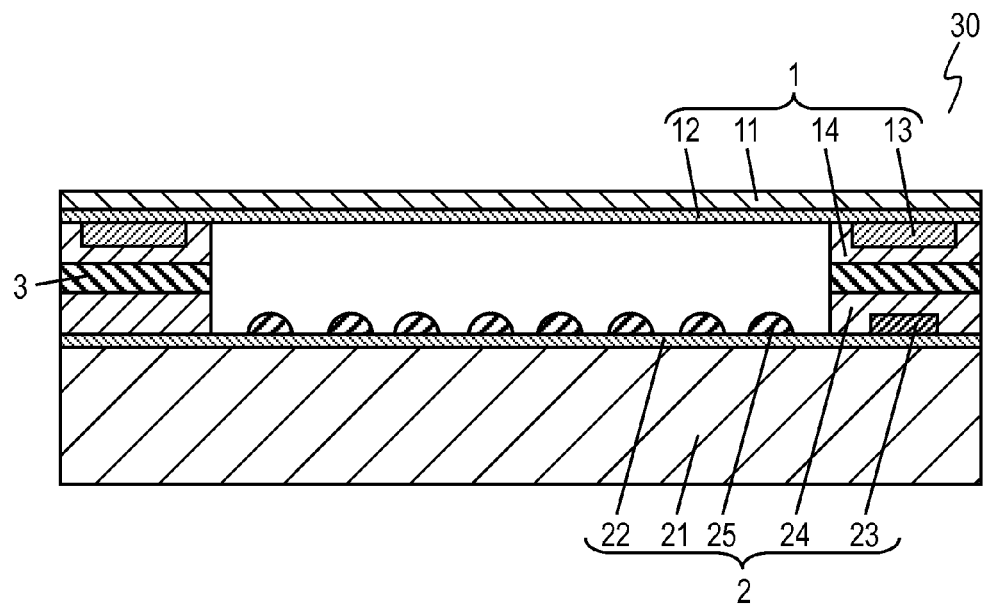
FIG. 4 is a sectional view of a conventional touch panel.

In recent years, touch panels have been used in a wide variety of electronic devices, and the demand for larger touch panels has also increased. When conventional touch panel 4 shown in FIG. 4 is used in such a large touch panel, when a material obtained by dispersing silver powder in a resin is used as the materials of upper electrode 13 and lower electrode 23, voltage drop occurs depending on line lengths, accordingly degrading a detection accuracy of the depressed position.

Touch panel 60 according to the embodiment is applicable to a large size, and has high resistance to environment, such as a high-temperature, and high-humidity atmosphere.

The environment resistance of touch panel 60 in the high-temperature, high-humidity atmosphere will be described below. Samples of touch panel 60 are manufactured, and evaluated in the environment resistance based on a contact resistance between upper conductive layer 42 and upper electrode 43.

In the case that sufficient electric conductivity between upper conductive layer 42 and upper electrode 43 is not obtained by intermediate layer 45, if moisture is infiltrated from upper substrate 41 of touch panel 60 used in a high-temperature, high-humidity atmosphere, chemical changes occur in an interface between upper conductive layer 42 and intermediate layer 45 and an interface between intermediate layer 45 and upper electrode 43, thereby increasing the contact resistances thereof. Intermediate layer 45 provides a sufficient electric conductivity between upper conductive layer 42 and upper electrode 43, and suppresses a change in contact resistance caused by infiltration of moisture.

In the samples, upper substrate 41 is made of polyethylene terephthalate, and a surface resistance of upper conductive layer 42 is 500 Ω/□. After upper conductive layer 42 is formed, an absorptance of upper substrate 41 is 0.6% (after immersion for 24 hours, and a measurement method conforms to JISK7209). Upper electrode 43 contains a polyester resin and 89 wt. % of silver and has a thickness of 0.01 mm and a width of 0.5 mm. Intermediate layer 45 contains a phenol resin and carbon, and has a width of 0.5 mm.

Table 1 shows contact resistances Rc between upper conductive layer 42 and upper electrode 43 when compositions of carbon, i.e., the content of carbon black and the content of graphite for an entire carbon defined as 100% are changed. In Table 1, symbol "A" denotes a preferable sample having contact resistance Rc less than 3Ω, and symbol "NG" denotes an undesirable sample having contact resistance Rc not less than 3Ω shown together with the resistance.

TABLE 1

| Content of Graphite (wt. %) | Content of Carbon Black (wt. %) | Contact Resistance Rc |
|---|---|---|
| 0 | 100 | NG (100 Ω) |
| 10 | 90 | NG (40 Ω) |
| 40 | 60 | A |
| 65 | 35 | A |
| 75 | 25 | NG (20 Ω) |
| 80 | 20 | NG (180 Ω) |

As shown in Table 1, the ratio of the content of graphite to an entire carbon is preferably not less than 40 wt. % and not larger than 65 wt. %.

Table 2 shows evaluation results changing with time when the thickness of intermediate layer 45 is changed in an atmosphere under a temperature of 85° C. and a humidity of 85%. In Table 2, symbol "A" denotes a preferable sample having contact resistance Rc less than 3Ω, and symbol "NG" denotes an undesirable sample having contact resistance Rc not less than 3Ω shown together with the resistance. Note that the same result as described above is obtained if the content of carbon ranges from 40 wt. % to 90 wt. %. Table 2 shows a result of samples having the content of carbon of 58 wt. % as a typical value.

TABLE 2

| Thickness of Intermediate Layer (μm) | Contact Resistance Rc | | |
|---|---|---|---|
| | Initial Value | After 250 Hours | After 500 Hours |
| 0.5 | A | NG (60 Ω) | NG (120 Ω) |
| 1 | A | A | A |
| 10 | A | A | A |
| 50 | A | A | A |
| 100 | A | A | NG (60 Ω) |

As shown in Table 2, the thickness of intermediate layer 45 ranges preferably from 1 μm to 50 μm to obtain contact resistance Rc less than 3Ω even after 500 hours.

Table 3 shows contact resistance Rc changing with time when the content of carbon of intermediate layer 45 is changed in an atmosphere under a temperature of 85° C. and a humidity of 85%. In Table 3, symbol "A" denotes a preferable sample having contact resistance Rc less than 3Ω, and symbol "NG" denotes an undesirable sample having contact resistance Rc not less than 3Ω shown together with the resistance. Note that the same result as described above is obtained when the thickness of intermediate layer 45 ranges from 1 μm to 50 μm. Table 3 shows a result of samples including eth intermediate layer having the thickness of 10 μm as a typical value.

TABLE 3

| Content of Carbon (wt. %) | Contact Resistance Rc | | |
|---|---|---|---|
| | Initial Value | After 250 Hours | After 500 Hours |
| 20 | A | NG (7 Ω) | NG (24 Ω) |
| 30 | A | NG (55 Ω) | NG (120 Ω) |
| 40 | A | A | A |
| 50 | A | A | A |
| 60 | A | A | A |
| 80 | A | A | A |
| 90 | A | A | A |

As shown in Table 3, the content of carbon of intermediate layer 45 ranges preferably from 40 wt. % to 90 wt. %, to obtain contact resistance Rc less than 3Ω even after 500 hours.

Figure 3:
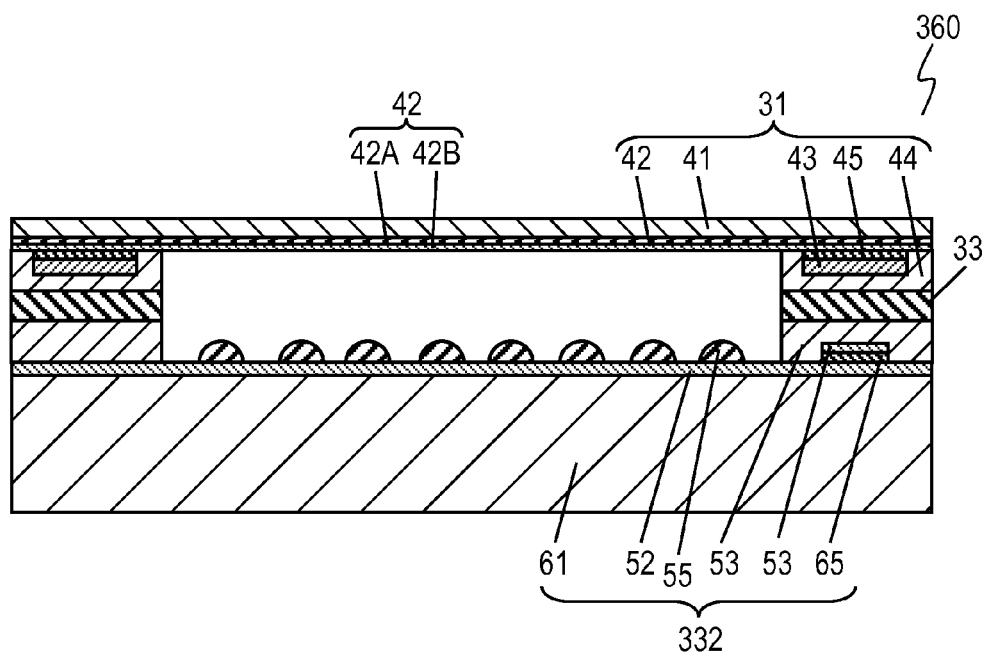
FIG. 3 is a sectional view of another touch panel according to the embodiment.

FIG. 3 is a sectional view of another touch panel 360 according to the embodiment. In FIG. 3, components identical to those of touch panel 60 shown in FIGS. 1 and 2 are denoted by the same reference numerals. Touch panel 360 shown in FIG. 3 includes lower wiring plate 332 instead of lower wiring plate 32 of touch panel 60 shown in FIG. 1. Lower wiring plate 332 shown in FIG. 3 includes lower substrate 61 instead of lower substrate 51 of lower wiring plate 32 shown in FIG. 1, and further includes intermediate layer 65 provided between lower conductive layer 52 and lower electrode 53. Intermediate layer 65 is preferably made of the same material as that of intermediate layer 45. Lower substrate 61 is made of a resin film, such as a polyethylene terephthalate resin film, having high light transmittance. Lower substrate 61 transmits moisture more easily than lower substrate 51 shown in FIG. 1. When moisture infiltrates through lower substrate 61, intermediate layer 65 functions similarly to intermediate layer 45.

Insulating layer 54 and lower conductive layer 52 cover lower electrode 53 and intermediate layer 65 to sandwich lower conductive layer 52 and intermediate layer 65. This structure prevents moisture from infiltrating in lower electrode 53 and intermediate layer 65, and hence, electrically connects lower electrode 53 with lower conductive layer 52 stably.

The material of upper substrate 41 may be, for example, a polycarbonate resin serving as a light-transmitting material besides a polyethylene terephthalate resin. Furthermore, a hard coat layer obtained by coating with a thin film made of a material having a relatively high hardness for scratch resistance or an anti-Newton ring layer obtained by making fine unevenness to improve the visibility may be formed on the upper and lower surfaces of the substrate.

Upper conductive layer 42 and lower conductive layer 52 may be made of tin oxide, zinc oxide, or conductive material, such as gold, silver, copper, or conductive polymer or a conductive material obtained by combining the above materials.

The conductive metal contained in upper electrode 43 and lower electrode 53 is silver. The conductive metal may be a metal, such as gold, copper, nickel, or mixture thereof besides silver. In the case that the conductive metal is silver, upper electrode 43 and lower electrode 53 can be easily formed with a silver paste that is relatively easily available.

In the case that adhesive layer 33 has high insulating property, insulating layers 44 and 54 may not necessarily be formed. In this case, adhesive layer 33 functions as insulating layers 44 and 54. Materials of insulating layers 44 and 54 and adhesive layer 33 are not limited to the above materials.

In touch panels 60 and 360 according to the embodiment, the electric connection between upper electrode 43 and upper conductive layer 42 can be made stable while lowering the resistances of upper electrode 43 and lower electrode 53, providing touch panels 60 and 360 with high resistance to environment and allowing touch panels 60 and 360 to be applicable to a large size.

Insulating layer 44 is formed on the lower surface of upper electrode 43, and covers upper electrode 43 and intermediate layer 45 with upper conductive layer 42. This structure prevents moisture from infiltrating, and stabilizes an electric connection between upper electrode 43 and upper conductive layer 42.

In the case that silver is used as a conductive metal contained in upper electrode 43 and lower electrode 53, upper electrode 43 and lower electrode 53 can be manufactured by using a material, such as a silver paste, that is relatively easily available.

According to the embodiment, terms, such as "upper surface" and "lower surface", indicating directions indicates relative directions depending only on the relative positional relationship of components, such as the upper substrate, the upper conductive layer, the upper electrode, the lower substrate, the lower conductive layer, and the lower electrode, of the touch panels, and do not indicate absolute directions, such as a vertical direction.

What is claimed is:

1. A touch panel comprising:
   an upper substrate having insulating property;
   an upper conductive layer provided on a lower surface of the upper substrate;
   a first intermediate layer provided on a lower surface of the upper conductive layer;
   an upper electrode provided on a lower surface of the first intermediate layer;
   a lower conductive layer facing the upper electrode with a predetermined gap interposed between the lower conductive layer and the upper electrode;
   a second intermediate layer provided on an upper surface of the lower conductive layer;
   a lower electrode provided on an upper surface of the second intermediate layer; and
   a lower substrate provided on a lower surface of the lower conductive layer, the lower substrate having insulating property,
   wherein each of the upper electrode and the lower electrode contains 70 wt. % to 98 wt. % of conductive metal,
   wherein the first intermediate layer contains a resin and 40 wt. % to 90 wt. % of carbon, and has a thickness ranging from 1 μm to 50 μm, and
   wherein the second intermediate layer contains a resin and carbon.

2. The touch panel according to claim 1, wherein the carbon included in the first intermediate layer contains carbon black and not less than 40 wt. % and not more than 65 wt. % of graphite.

3. The touch panel according to claim 2, further comprising an insulating layer provided on a lower surface of the upper electrode,
   wherein the upper electrode and the first intermediate layer are covered between the insulating layer and the upper conductive layer.

4. The touch panel according to claim 1, further comprising an insulating layer provided on a lower surface of the upper electrode,
   wherein the upper electrode and the first intermediate layer are covered between the insulating layer and the upper conductive layer.

5. The touch panel according to claim 1, wherein the conductive metal contained in the upper electrode and the lower electrode comprises silver.

6. The touch panel according to claim 1, wherein the second intermediate layer contains the resin and 40 wt. % to 90 wt. % of the carbon, and has a thickness ranging from 1 μm to 50 μm.

7. The touch panel according to claim 6, wherein the carbon contained in the second intermediate layer contains carbon black and not less than 40 wt. % and not more than 65 wt. % of graphite.

8. The touch panel according to claim 1, wherein the upper electrode entirely covers the lower surface of the first intermediate layer.

9. The touch panel according to claim 1, wherein the lower electrode entirely covers the upper surface of the second intermediate layer.

10. A touch panel comprising:
an upper substrate having insulating property;
an upper conductive layer provided on a lower surface of the upper substrate;
an intermediate layer provided on a lower surface of the upper conductive layer;
an upper electrode provided on a lower surface of the intermediate layer;
a lower conductive layer facing the upper electrode with a predetermined gap interposed between the lower conductive layer and the upper electrode;
a lower electrode provided on an upper surface of the lower conductive layer; and
a lower substrate provided on a lower surface of the lower conductive layer, the lower substrate having insulating property,
wherein each of the upper electrode and the lower electrode contains 70 wt. % to 98 wt. % of conductive metal,
wherein the intermediate layer contains a resin and 40 wt. % to 90 wt. % of carbon, and has a thickness ranging from 1 µm to 50 µm, and
wherein the upper electrode entirely covers the lower surface of the intermediate layer.

11. The touch panel according to claim 10, wherein the carbon contains carbon black and not less than 40 wt. % and not more than 65 wt. % of graphite.

12. The touch panel according to claim 11, further comprising
an insulating layer provided on a lower surface of the upper electrode,
wherein the upper electrode and the intermediate layer are covered between the insulating layer and the upper conductive layer.

13. The touch panel according to claim 10, further comprising
an insulating layer provided on a lower surface of the upper electrode,
wherein the upper electrode and the intermediate layer are covered between the insulating layer and the upper conductive layer.

14. The touch panel according to claim 10, wherein the conductive metal contained in the upper electrode and the lower electrode comprises silver.

15. A touch panel comprising:
an upper substrate having insulating property;
an upper conductive layer provided on a lower surface of the upper substrate;
an intermediate layer provided on a lower surface of the upper conductive layer;
an upper electrode provided on a lower surface of the intermediate layer;
a lower conductive layer facing the upper electrode with a predetermined gap interposed between the lower conductive layer and the upper electrode;
a lower electrode provided on an upper surface of the lower conductive layer; and
a lower substrate provided on a lower surface of the lower conductive layer, the lower substrate having insulating property,
wherein each of the upper electrode and the lower electrode contains 70 wt. % to 98 wt. % of conductive metal,
wherein the intermediate layer contains a resin and 40 wt. % to 90 wt. % of carbon, and has a thickness ranging from 1 µm to 50 µm, and
wherein the upper conductive layer includes:
a light-transmitting conductive layer; and
a conductive polymer film closer to the intermediate layer than the light-transmitting conductive layer.

16. The touch panel according to claim 15, wherein the light-transmitting conductive layer is provided on the lower surface of the upper substrate.

17. The touch panel according to claim 15, wherein the conductive polymer layer is provided on a lower surface of the light-transmitting conductive layer.

18. The touch panel according to claim 15, wherein the intermediate layer is provided on a lower surface of the conductive polymer layer.

19. The touch panel according to claim 15,
wherein the light-transmitting conductive layer is provided on the lower surface of the upper substrate,
wherein the conductive polymer layer is provided on a lower surface of the light-transmitting conductive layer, and
wherein the intermediate layer is provided on a lower surface of the conductive polymer layer.

* * * * *